April 4, 1961  C. SURICO  2,978,157
SPAGHETTI AND MACARONI HANDLING MACHINE
Filed Dec. 7, 1955  9 Sheets-Sheet 5
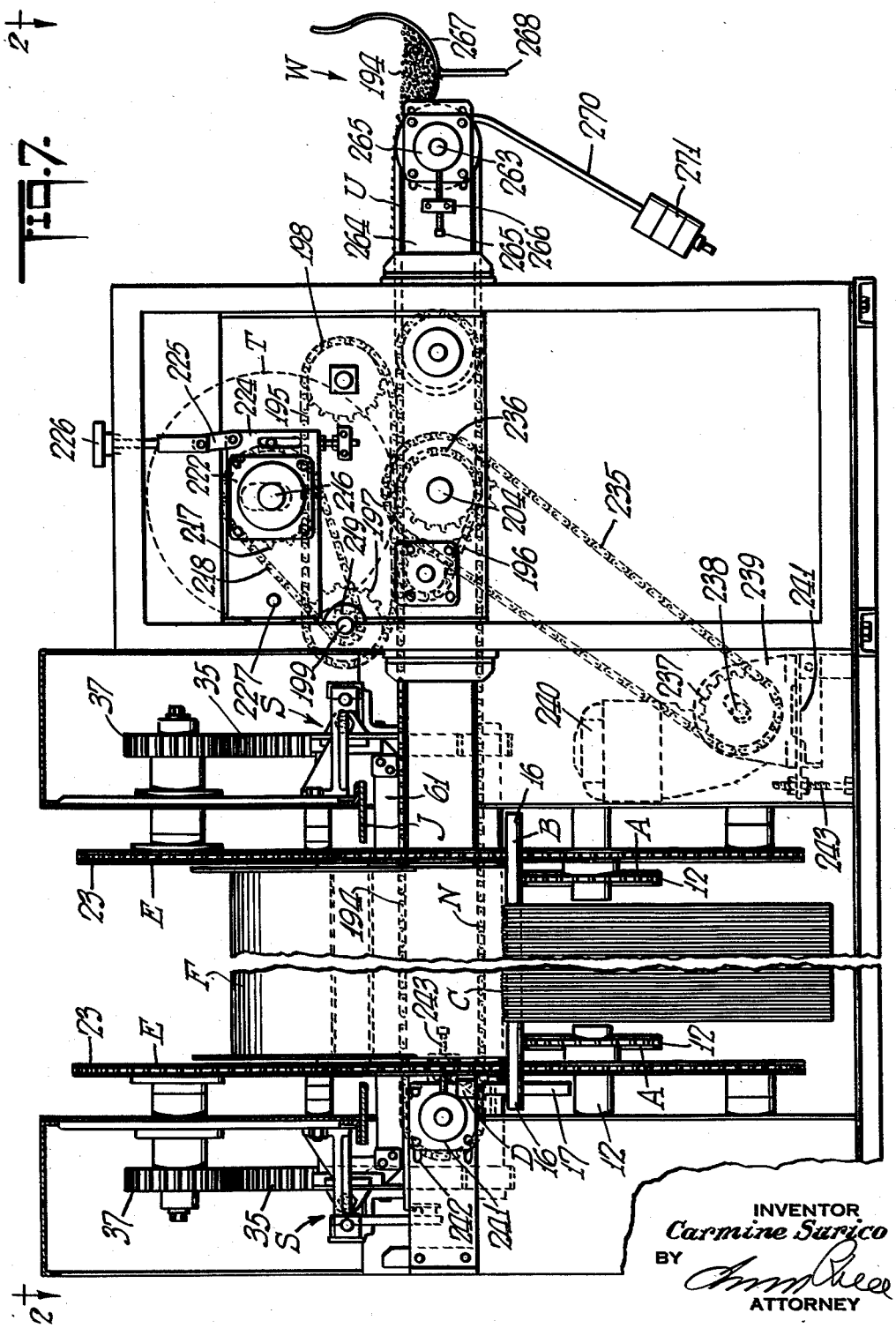
INVENTOR
Carmine Surico
BY
ATTORNEY

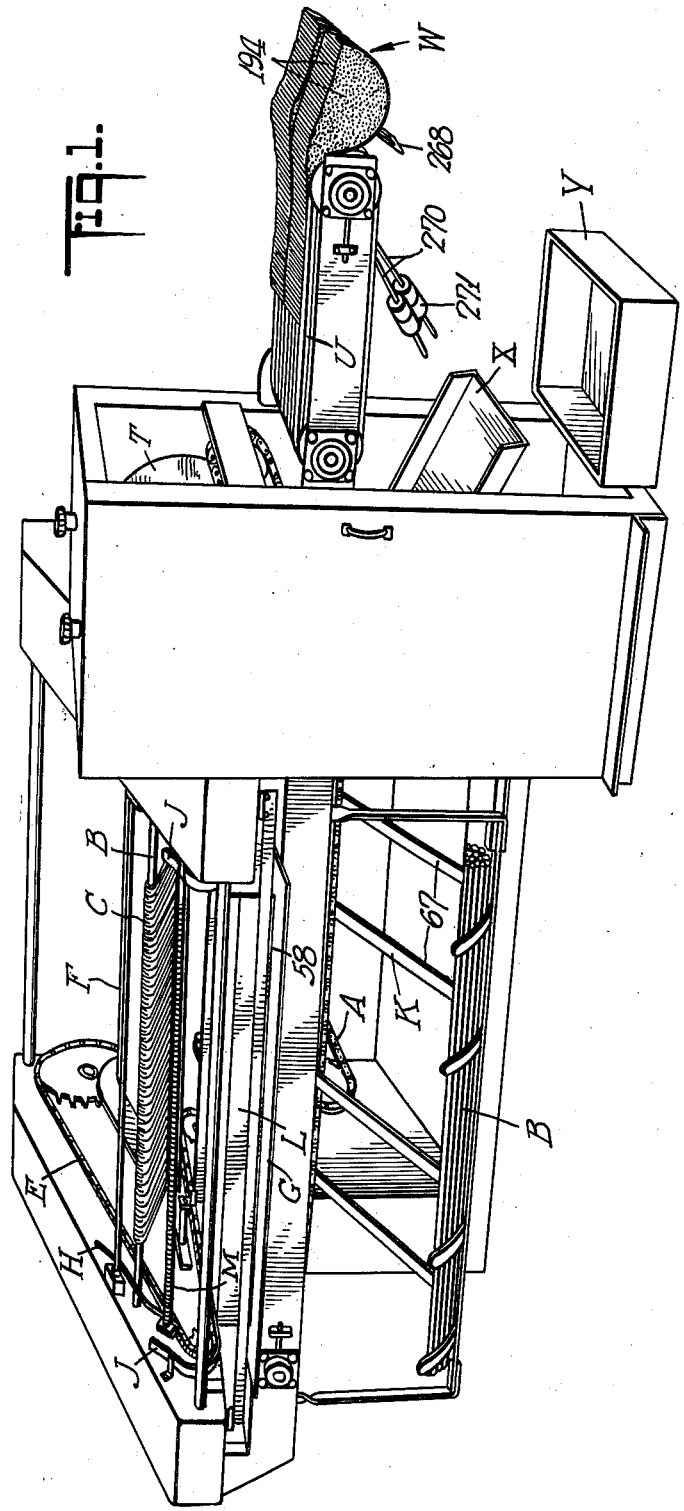

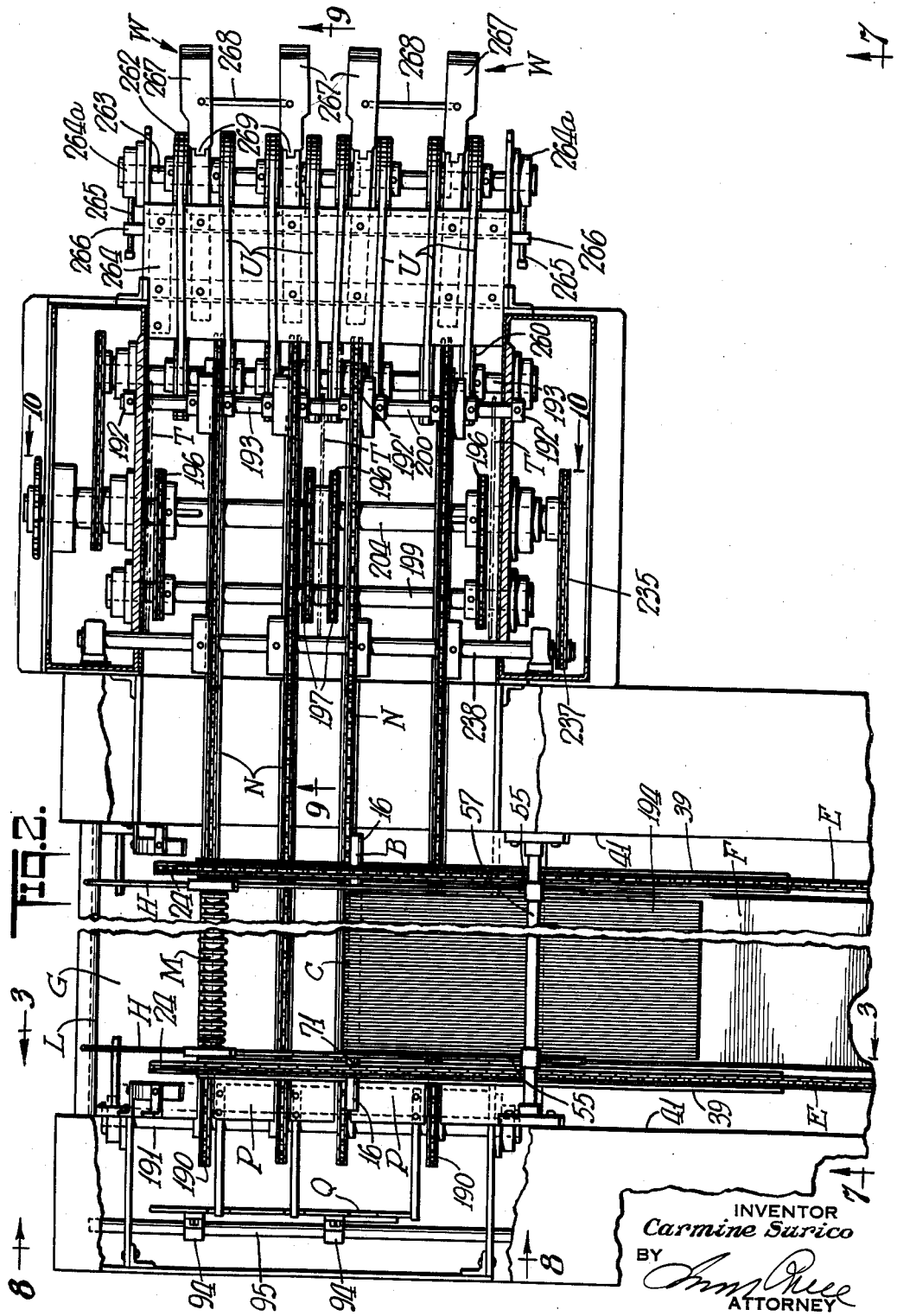

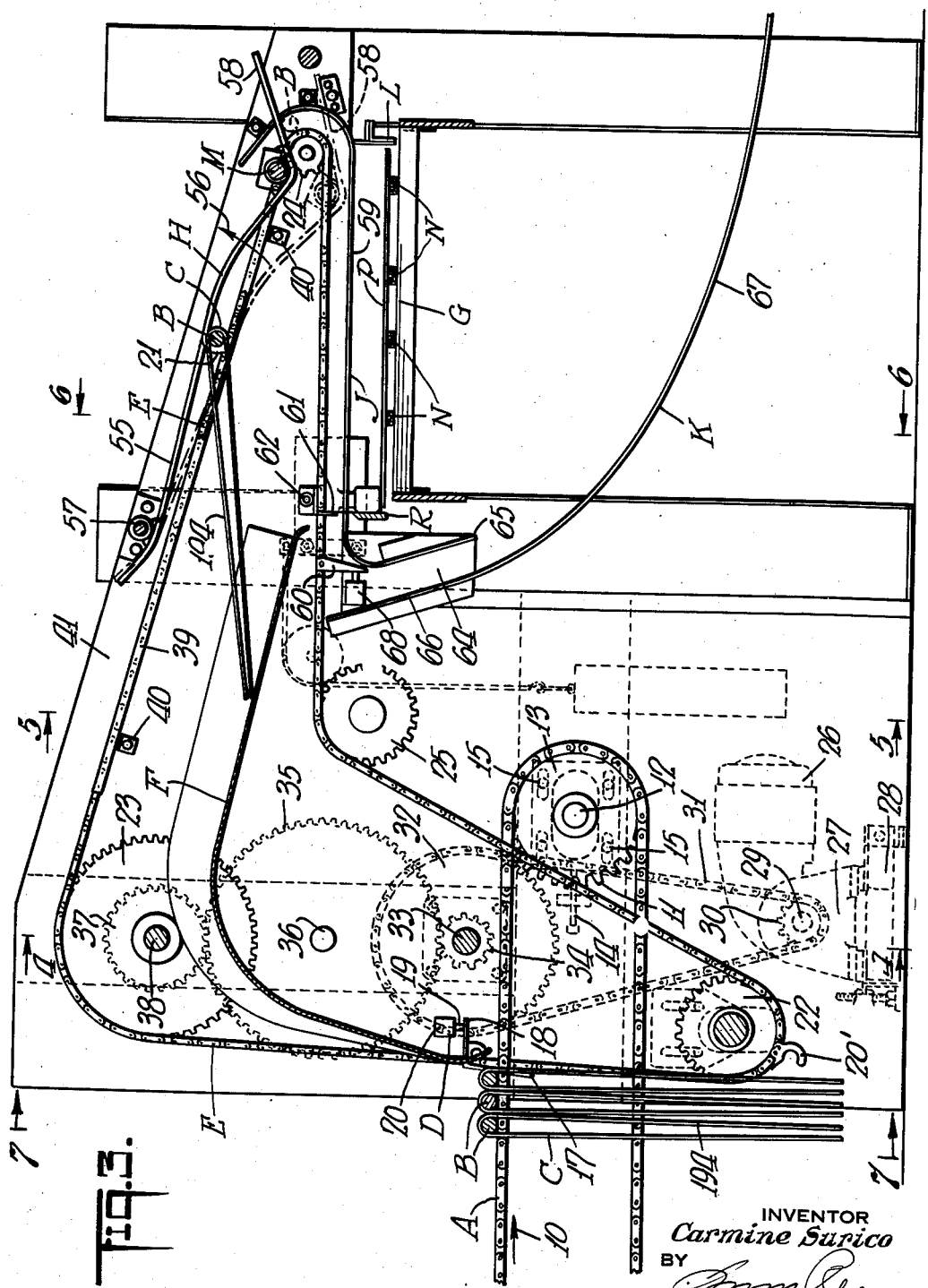

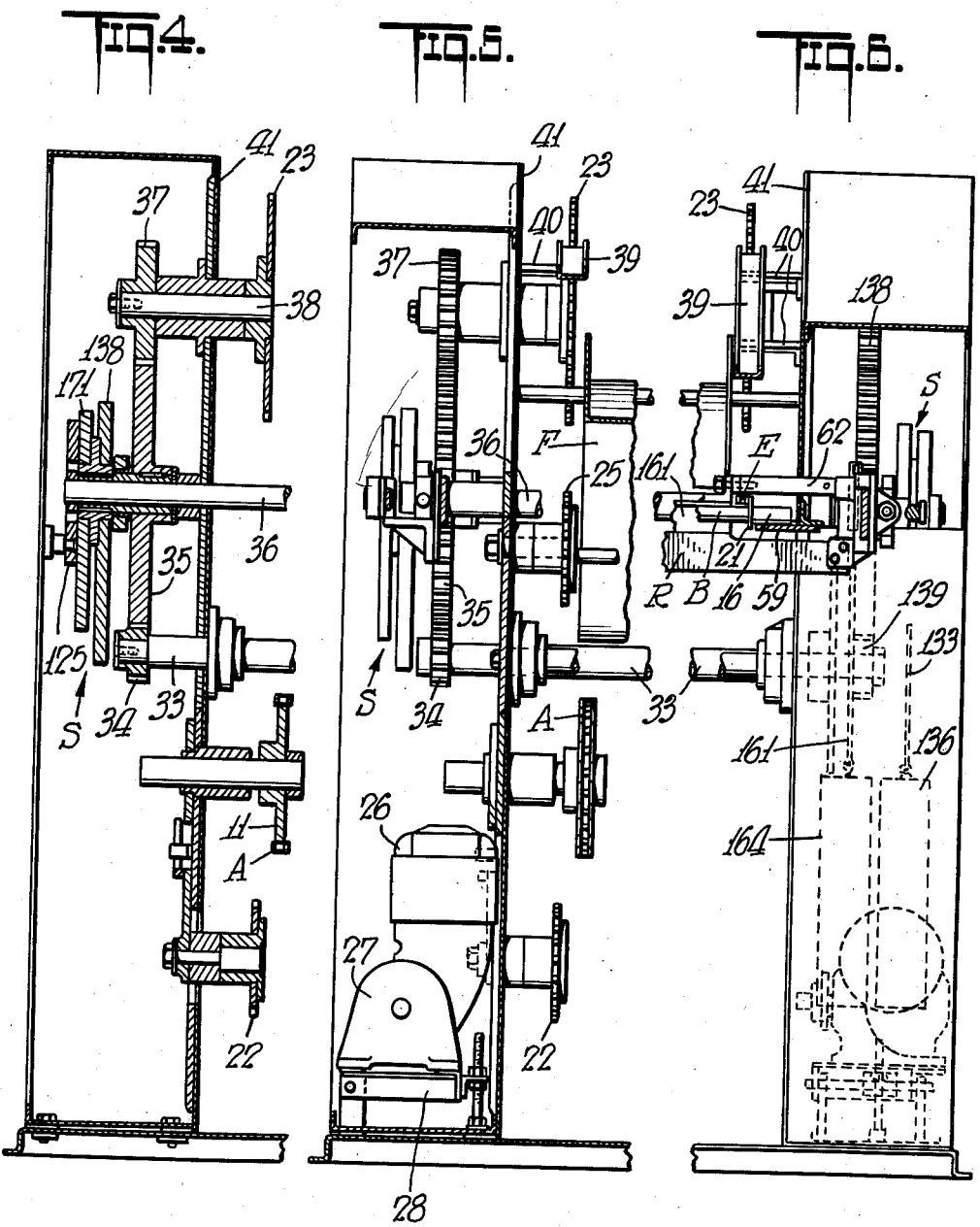

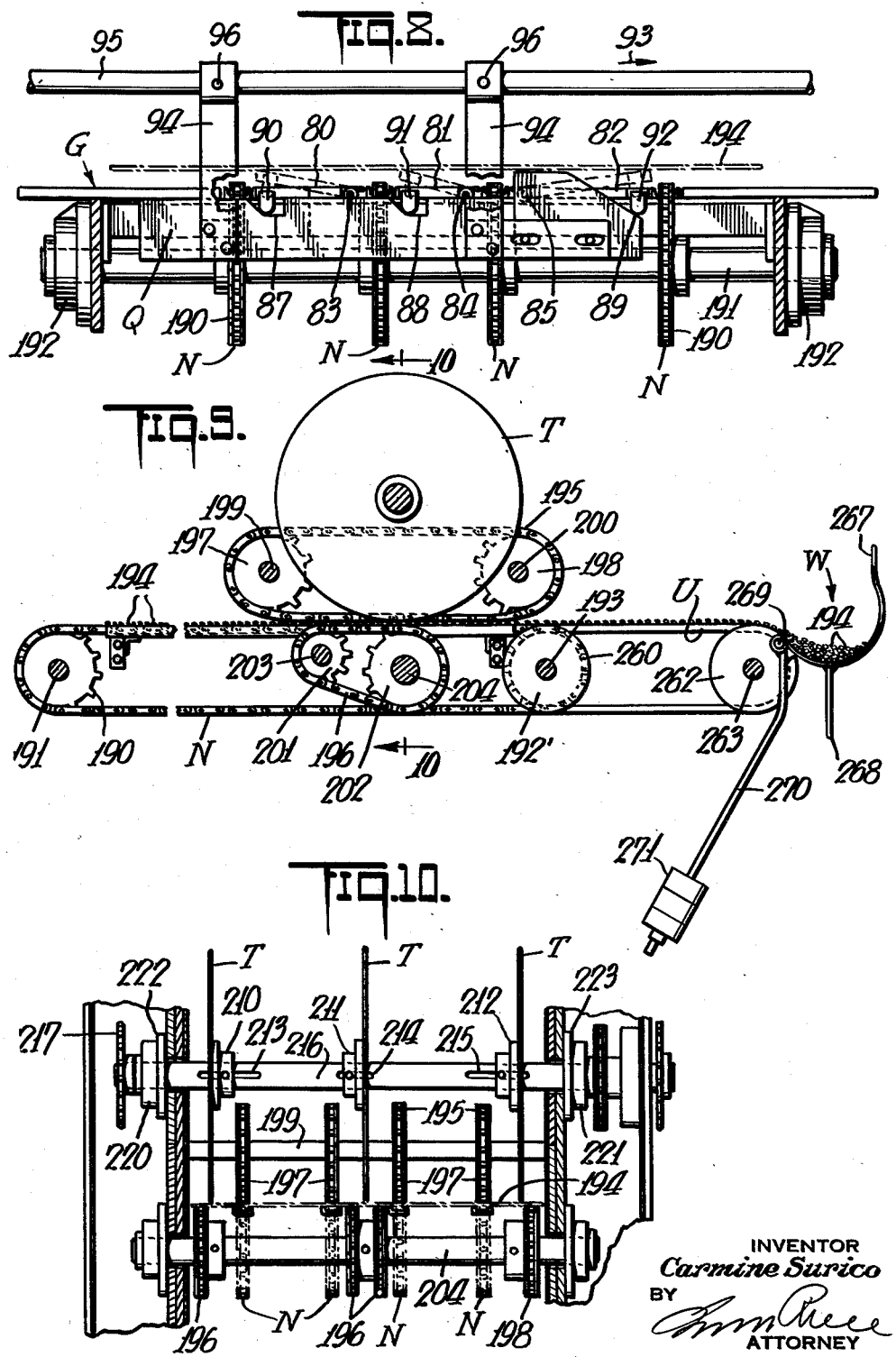

April 4, 1961  C. SURICO  2,978,157
SPAGHETTI AND MACARONI HANDLING MACHINE
Filed Dec. 7, 1955  9 Sheets-Sheet 7
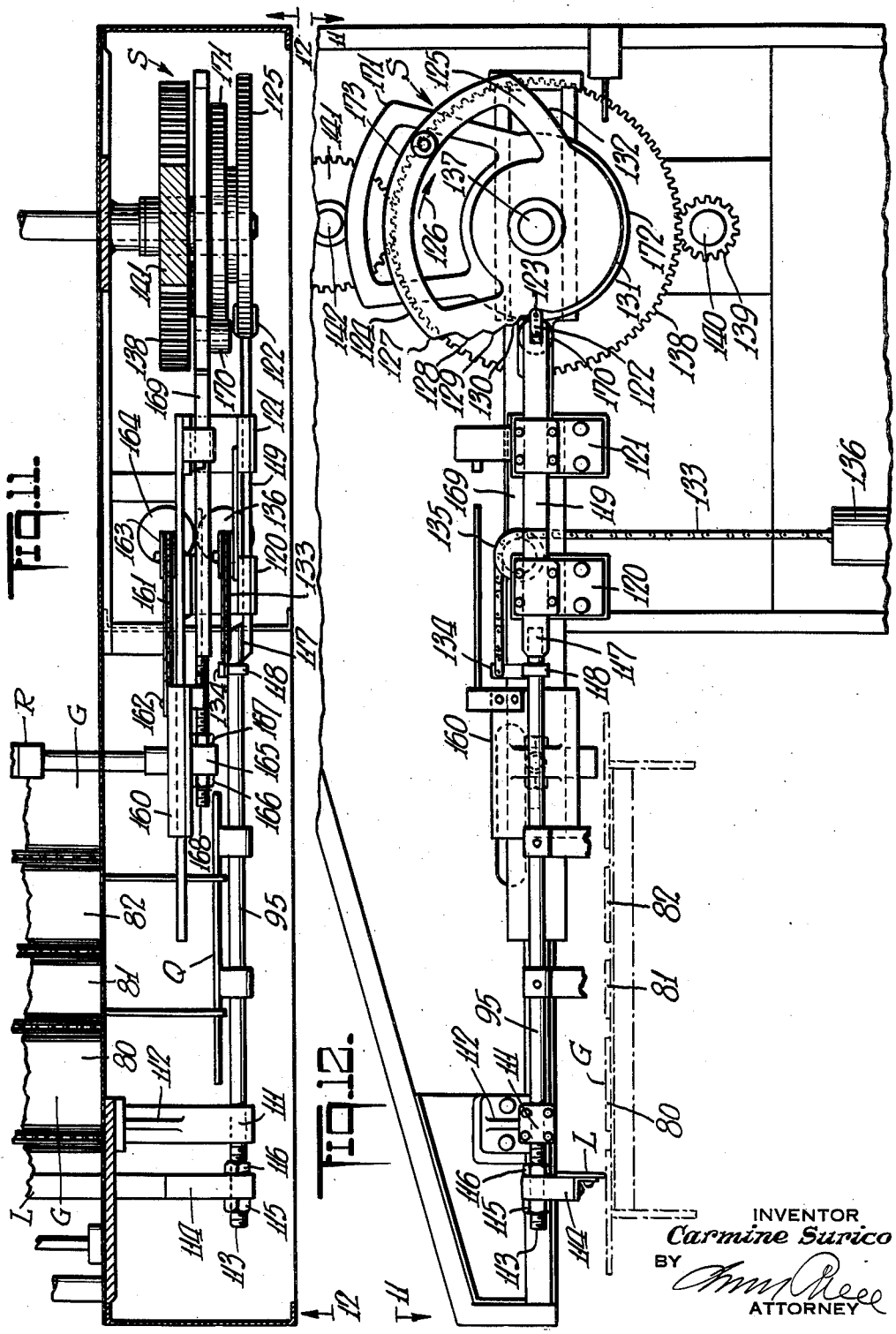
INVENTOR
*Carmine Surico*
BY
ATTORNEY

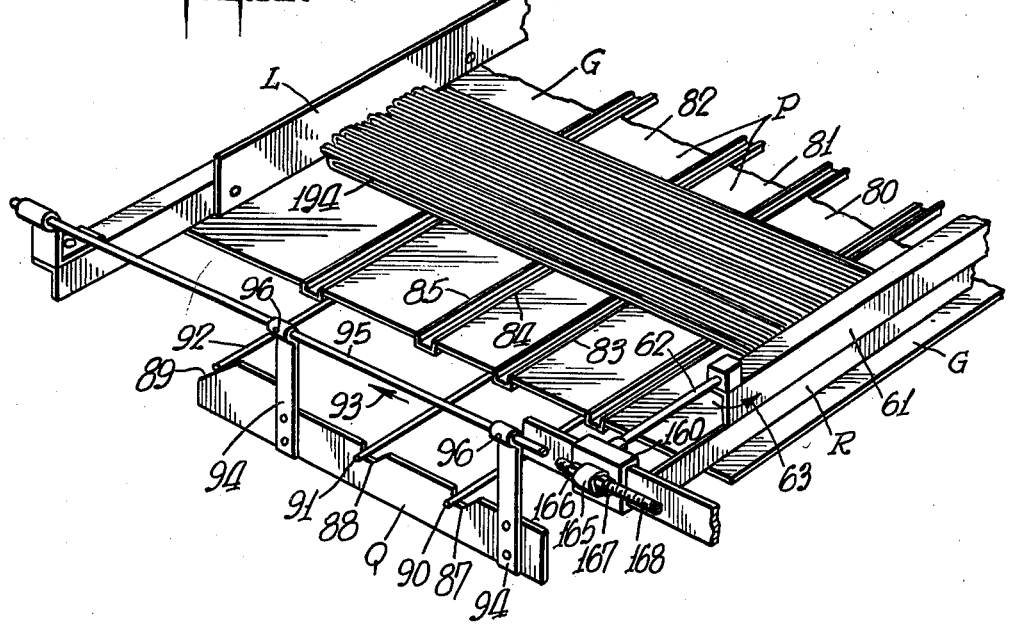
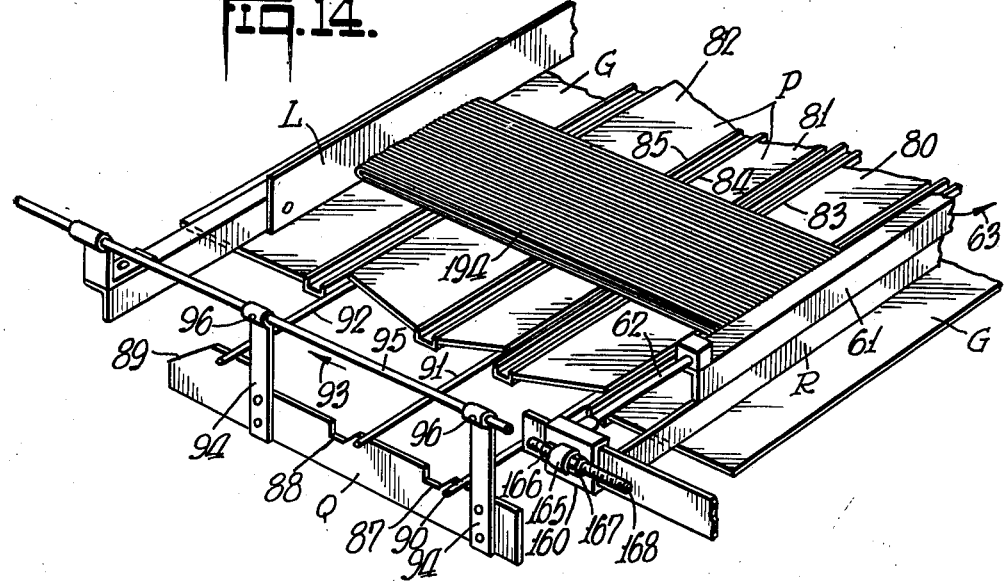

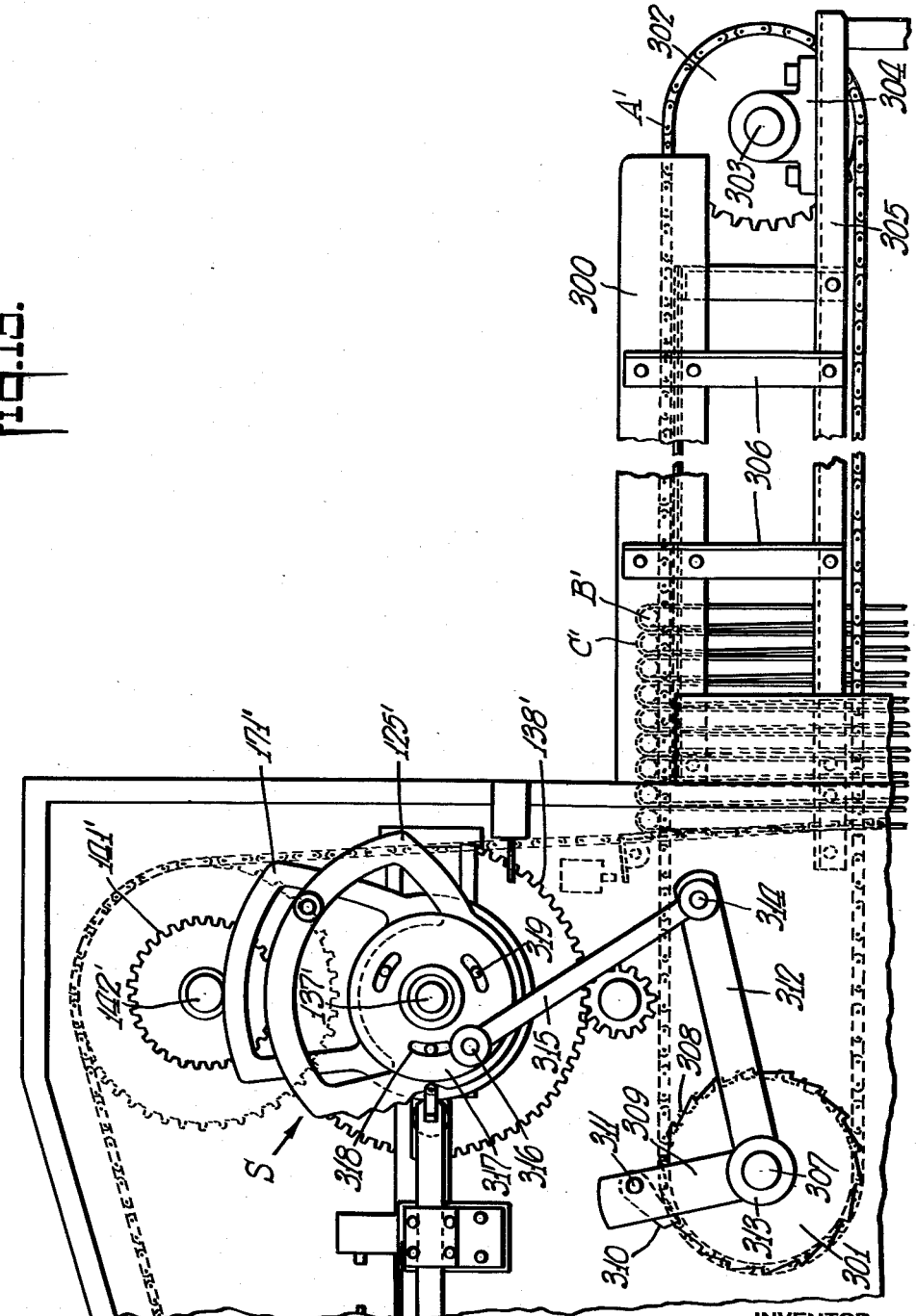

United States Patent Office 2,978,157
Patented Apr. 4, 1961

2,978,157

SPAGHETTI AND MACARONI HANDLING MACHINE

Carmine Surico, Bayville, N.Y., assignor to Clermont Machine Company, Inc., Brooklyn, N.Y., a corporation of New York Filed Dec. 7, 1955, Ser. No. 551,700

8 Claims. (Cl. 225—97)

The present invention relates to a machine for handling spaghetti and macaroni materials, and it particularly relates to a machine for transferring them from sticks and subsequently processing them so that they will be ready for packaging and merchandizing.

In the processing of spaghetti or macaroni or similar products, the material is handled in its final stages of drying and finishing upon long sticks which are conveyed at their ends and which intermediately in their lengths carry a large number of closely spaced, depending, inverted U-shaped sections of spaghetti or macaroni products.

There is considerable loss and damage to the spaghetti with these dried or finished loops or U-shaped members are removed from the sticks by hand, and furthermore the cost of manufacturing is greatly increased, due to the amount of labor which is required in addition to the substantial loss due to breakage.

It is among the objects of the present invention to provide a novel machine and method of finishing spaghetti, macaroni and similar products in which the finished, dried spaghetti or macaroni product, while still on the stick, will be handled in a sanitary fashion, without manual intervention, with substantially automatic removal of the sticks and with preparation of the spaghetti lengths in suitable divisions for proper packaging, merchandizing and subsequent treatment.

Another object is to provide an automatic spaghetti processing machine in which the spaghetti or macaroni is handled substantially automatically after it has been dried and finished to remove the sticks and prepare it in proper cut lengths for subsequent commercialization and merchandizing.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to convey the sticks carrying the dried spaghetti to a horizontalizing conveyor, which will change the position of the spaghetti so that the long U-shaped strands thereof are changed from vertical position to substantially horizontal position without breakage thereof and with the stick still in position and serving as the conveyor connection.

In the preferred form this is done by carrying the spaghetti over an apron by means of a conveyor, which apron has a substantially right angular shape so as to first contact the lower depending ends of the spaghetti or macaroni loops, following which the stick is carried forward while the lower ends of the loops are gradually elevated until they are in substantially horizontal position, with the stick preceding.

This apron then gradually slopes toward the table, upon which the loops of spaghetti are deposited, and upon which table they are held while the sticks are removed therefrom.

In the preferred form the table is provided with a series of conveyor members which extend transversely all the loops of the spaghetti or macaroni, and between these conveyors, which may take the form of chains, there are positioned a series of elongated plates. These plates are pivotally mounted at one side so that they may be elevated at one edge to elevate the spaghetti being placed upon the table above the conveyor members or chains while it is being aligned and correctly positioned for subsequent processing.

Generally, the table is provided with a vertical wall, which will be adjacent to the loop ends of the spaghetti and which will be away from the direction in which the spaghetti was deposited upon the table, and it also is provided with a back wall which will be adjacent to the leg ends of the spaghetti.

When the spaghetti has been deposited upon this table with the legs in horizontal position, the stick will actuate a member taking the form of a cam, which will lift the stick from the conveyor chain and deposit it upon side tracks, which are positioned above the spaghetti.

When this occurs the stick will be moved by extensions on the conveyor chain from between the legs of the spaghetti, and then through a swinging wall portion at the end of the chamber adjacent to the ends of the legs of the spaghetti, and finally the stick will be ejected into a chute and then into a bin.

In the meanwhile, the loops of the spaghetti, as they are deposited upon the table, will be aligned by means of a grooved rod extending across the table, and also by means of serrations in the edges of the pivotally mounted elongated plates extending across the table and between the chain or other conveyors.

The wall at the end of the table adjacent to the loop ends of the spaghetti may then be guided in a series of short successive movements to advance the spaghetti loops toward the other wall, and thus assure the correct alignment of the ends of the spaghetti loops while the serrated and threaded members cause the spaghetti loops to lie perpendicularly to the chain conveyors and in parallelism to each other.

As soon as this positioning operation has been completed and the spaghetti is correctly transversely positioned and parallelly located upon the table, it is immediately removed from the table by initiation of operation of the conveyor chains.

This movement is to the side of the table, and may either be to the left side or the right side, or may be alternatively either right side or left side, depending upon the machine which is to be utilized.

The loops of spaghetti are then passed through breaking walls while they are being held down so that they cannot move laterally.

These breaking walls consist of large circular plates which exert a breaking stress upon the long, relatively brittle spaghetti legs as they are being carried by the chains transversely away from the table upon which they have been positioned and aligned.

In a preferred form of the invention the loops are removed and the spaghetti is broken into equal lengths.

Then after this breaking operation takes place, the spaghetti is conveyed by means of belt conveyors to suitable receptacles, from which it may be removed and packaged.

The entire operation may be controlled by a series of micro-switches, which will actuate the successive operations, depending upon the position of the stick and the position of the spaghetti and the stage of the processing.

The first two micro-switches may be positioned at the sides of the conveyors, where the horizontal conveyor transfers the sticks of spaghetti or macaroni to the horizontalizing conveyor.

This will assure that both ends of the stick are in correct position, since the ends of the stick will have to operate both micro-switches simultaneously before the horizontalizing conveyor will pick up the stick carrying the spaghetti from the vertical conveyor.

The next micro-switch is actuated when the spaghetti has been deposited upon the table by the horizontalizing conveyor, and this will cause the operations lifting the spaghetti above and off of the chain by pivoting the table plates upwardly and will assure the forward stepwise motion of the table end wall, which acts upon the bends of the spaghetti loops to align them.

When this alignment operation has been completed the final operation consists of actuating the transverse conveyors which move the spaghetti to the side, cause it to break into the desired lengths, following which it is deposited in the hoppers or receptacles ready for disposal.

With the foregoing and other objects in view the invention consists of the novel construction, combination and arrangements of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a front perspective view of the machine of the present invention showing one stick of spaghetti being moved toward the front end of the machine just before it is deposited upon the table, with the transverse conveyor having already conveyed a substantial stack of cut spaghetti to the right.

Fig. 2 is a top plan view of the machine of Fig. 1, showing a stick of spaghetti as it is being advanced toward the table, without, however, showing the stacked up spaghetti in the hoppers, the hoppers in Fig. 2, however, being shown upon the right instead of upon the left as indicated in Fig. 1, so as to clarify the showing, Fig. 2 being taken upon the line 2—2 of Fig. 7.

Fig. 3 is a transverse vertical sectional view taken upon the line 3—3 of Fig. 2, showing the transfer of the spaghetti from vertical to horizontal position.

Fig. 4 is a transverse vertical sectional view taken upon the line 4—4 of Fig. 3, showing the gearing connections.

Fig. 5 is a transverse sectional view taken upon the line 5—5 of Fig. 3.

Fig. 6 is a vertical transverse sectional view taken upon the line 6—6 of Fig. 3.

Fig. 7 is a transverse vertical sectional view taken upon the line 7—7 of Fig. 2.

Fig. 8 is a transverse vertical sectional view taken upon the line 8—8 of Fig. 2, showing the elevating cam for the table plates.

Fig. 9 is a transverse vertical sectional view taken upon the line 9—9 of Fig. 2, showing spaghetti breaking arrangement.

Fig. 10 is a transverse vertical sectional view taken upon the line 10—10 of Fig. 9.

Fig. 11 is a transverse sectional view taken upon the line 11—11 of Fig. 12, showing the side cam control arrangement.

Fig. 12 is a side elevational view taken from the line 12—12 of Fig. 11.

Fig. 13 is a perspective view of the table G immediately after the spaghetti has been deposited thereon.

Fig. 14 is a perspective view of the table G after the aligning wall L has been advanced.

Fig. 15 is a side elevational view similar to Fig. 12, showing a modified conveyor arrangement with a ratchet control.

Referring to Figs. 1, 2, 3, and 7, there is shown the incoming conveyor A, which carries a series of horizontal, transversely extending wooden poles or sticks B, each of which sticks has positioned thereupon closely spaced, inverted U-shaped loops of spaghetti C (see particularly the left side of Fig. 3).

The horizontal, transversely extending wooden poles or sticks B are then presented at their ends to their side micro-switch controls D, one of which is positioned at each side of the machine.

Then they are transferred to the horizontalizing conveyor E which carries them over the right angular apron F.

After being carried over the apron F, they are then deposited upon the table G. During this operation the sticks B will successively operate the swinging cam control members H, one being positioned at each side of the table (see particularly Fig. 1). These control members H will transfer the stick B from the horizontalizing conveyor E to the return guides J, whence they are discharged into the chute K.

The table has a front end wall L which has a stepwise advancing movement to align the spaghetti loops which have been previously placed in parallelism by the grooved or screwed rod M.

The table is provided with a series of transverse conveyor chains N, between which are positioned the pivotally mounted plates P. These plates are driven by means of the cam Q (see Fig. 8) so as to lift the spaghetti above the conveyor chains when it is being deposited and aligned by the end wall L. The other end wall R, which is adjacent to the leg ends of the spaghetti, has an opening or swinging wall portion which permits the sticks B to be discharged.

The operation of the cam Q, as well as the stepwise advancement of the front end wall L, is controlled by means of the cam arrangements S shown best in Figs. 11 and 12.

The spaghetti, after being aligned, is then carried by the chains N to the breakers or cutters T, best shown in Figs. 9 and 10. After the breaking or cutting operation, the spaghetti is carried by the belt conveyors U into the hoppers W, with any loose ends or broken ends being discharged through the conveyor into the discharge box Y.

Referring to Fig. 3, the initial chain conveyor A moves from the left as indicated by the arrow 10, and will carry a series of sticks of spaghetti loops B from the drying room not shown. This conveyor 10 extends into the machine to which the present invention is particularly directed, and is driven by the sprocket 11 on the shaft 12 (see Fig. 3).

The shaft 12 is mounted upon a plate 13, and it has an adjustment 14 with pin and slot arrangement 15.

As each end of the stick B, as indicated at 16 in Fig. 7, is presented to the depending arm 17 of the microswitch arrangement D, the horizontalizing conveyor E will be operated.

As shown in Fig. 3, the arm 17 has an extension 18 which acts upon the plunger member 19 of the switch box 30.

When both arms 17 at each side of the machine are pressed inwardly by the ends 16 of the stick B, this will initiate movement of the horizontalizing conveyor E to pick up one stick by means of its hook 20' (see lower part of Fig. 3).

The horizontalizing conveyor, as shown best in Fig. 3, has one hook 20' always in position to pick up a new stick B, while the other hook 21 is about to deposit a stick of spaghetti loops upon the table G.

The horizontalizing conveyor chain E is carried by the lower gear wheel 22, the upper sprocket wheel 23, by the forward end sprocket wheel 24 directly over the front end of the table G, and by the intermediate sprocket wheel 25 (see Fig. 3).

The drive for the sprocket wheel 23 is from the motor 26 which has a reduction gear box 27 and a base mounting 28 (see Fig. 3).

The reduction shaft 29 will drive the small sprocket 30, which in turn drives the chain 31.

The chain 31 drives the sprocket 32, which drives the shaft 33 and the small gear 34.

The gear 34 drives the large gear 35 on the shaft 36. The gear 35 in turn will drive the pinion 37 on the shaft 38 which carries the main drive sprocket 23.

The horizontalizing chains E, in moving downward toward the table G, pass through the guides 39.

These guides are held in position by means of the brackets 40 and side walls 41 (see Fig. 3).

As the ends of the sticks B are advanced toward the swinging cam members H, as shown in Fig. 3, they will first strike the end faces 55 of these side cams and swing them upwardly, as indicated by the arrow 56, from the dot and dash position indicated at the right of Fig. 3. Between the swinging cam members H extends the screwed rod M, which will ride in the legs of the spaghetti loops and correctly align them parallelly to their direction of movement and transverse to the table G.

The cam plates H are pivotally mounted upon a transverse rod 57, and depending downwardly is the remover hook 58, which engages the ends of each stick B as it comes around the end of the sprocket 24.

This will remove each stick B as it comes around the sprocket 24 from the hook 21, and will permit the hook then to move freely to the position 20' at the lower left hand end of Fig. 3.

As soon as the stick has been deposited in the hook 58, the hook 58 will return with the return of the plate H to dot and dash line position, as shown in Fig. 3, depositing the ends of the stick B upon the runway 59.

The stick will then be carried along the runway or guideway 59 by means of the depending prongs 60 on the chain E, which will then force the stick past the swinging portion 61 of the rear wall R (see Fig. 3).

The swinging wall portion 61 is pivotally mounted at 62, so that it may swing in the direction 63 to release a stick as it is carried across the guideways 59. When this occurs, the stick is being drawn out of the spaghetti loops and between the legs thereof, as such spaghetti loops are positioned upon the table G with the ends of the legs being held in position by means of the fixed wall portion R.

The sticks at the rear end of the table will then fall into chute 64, formed between the walls 65 and 66. The sticks will then move down through curved slideway 67 of the discharge member K, as indicated in Fig. 3.

The depending members 60, as they carry the sticks B to the discharge chute 64, will then actuate the microswitch 68 to actuate in turn the transverse chain conveyors N.

However, before this occurs, the spaghetti has been correctly positioned and aligned upon the table G.

As the spaghetti is being deposited and aligned upon the table G it will be held above the chains N by means of the elevated edges of the plates P. As shown in Fig. 8, three of the plates P, namely plates 80, 81, and 82, are pivotally mounted at 83, 84, and 85, so that they may elevate the spaghetti upwardly to the position indicated in the dot and dash lines 84 above the upper level of the chains N.

This is accomplished through the cam plate Q which has the camming notches 87 and 88 and the camming edge 89 acting upon the cam follower rods 90 and 91 and 92. These cam follower rods are attached to the lower sides of the edges of the plates which are to be elevated, and when the cam plate 87 is moved in the direction of the arrow 93, the plates will be elevated to the dot and dash line position.

It will be noted that the cam plate Q is carried by the depending straps 94 on the reciprocating rod 95. The straps 94 are attached to the rods 95 at 96. The rod 93 is actuated by means of the cam 97, which acts upon the roller 98 at the end 99 of the rod 95. The cam will so control the upward movement of the plates 80, 81, and 82 that this movement will take place as the spaghetti is being deposited in the table G and before the stick has been removed from between the legs of the spaghetti.

To align the spaghetti, the plate or wall L will be caused to advance against the loops with a series of short successive movements, with the result that the various U-shaped spaghetti elements will be accurately aligned upon the table and be ready to be carried by the chain N to the breaking or cutting devices T.

This table is actuated by means of the rod 110 (see Figs. 11 and 12), which is carried by the bearing 111 on the frame structure 112 and has an adjustable threaded connection to the bracket 113, which carries the wall element or pusher L directly above the plates 80, 81 and 82 on the table G.

The position of the wall or forward plate L may be adjusted by means of the nuts 115 and 116.

The rod 110 will extend forwardly until it is connected at 117 (see Fig. 12), adjacent to the collar 118, to the plate member 119. The plate member 119 extends through the guides 120 and 121, and it terminates in a clevis 122, which carries a roller 123.

The roller 123 will ride on the high portion 124 of the cam 125 before it is presented to the spaghetti loops, with the cam moving in the direction as indicated at 126 in Fig. 12. When the roller reaches the point 127, the spaghetti loops will have been deposited upon the table, and the plates 80, 81 and 82 will have been lowered, the sticks will have been removed, and the spaghetti loops will be ready for alignment.

When this occurs, the roller 123 will pass over the successive projections 128, 129 and 130, with each projection giving the plate an advancement and then withdrawal motion, which will gradually line up the spaghetti loops until the plate L achieves its maximum forward position when the roller 123 is on the low dwell 131 of the cam 125.

When the cycle is completed, the cam will return so that the roller will pass up the portion 132 of the cam 125 and will rest on the high dwell 124, where it will be in its maximum withdrawn position.

The roller 123 will be drawn against the cam by means of the chain 133, which engaged the upstanding bracket 134. This chain passes over the pulley 135, which carries the weight 136.

The cam shaft 137 will turn with the gear 138 and will mesh with the lower pinion 139 on the shaft 140 and with the upper gear 141 on the shaft 142.

Referring to Fig. 11, the slide member 160 is connected to the chain 161 by means of the rivet 162. The chain 161 passes over the pulley 163 and extends downwardly to the weight 164 which hangs directly in back of the chain 136. This will draw the slide 160 to the right, as shown in Figs. 11 and 12.

Associated with the slide 160 is the boss 165, which receives the nuts 166 and 167 to hold the threaded rod 168 in adjusted position.

The threaded rod 168 in turn is connected to the follower rod or bar 169, which has a roller follower at its right end actuated by the cam 171. The outline of the cam is best shown in Fig. 12, and has a low circular portion 172 and the elevated portion 173. In the position shown in Figs. 1 and 2 the slide element 160 will be moved to the right when the roller 170 is resting upon the lowest portion 172 of the cam 171. When the cam moves clockwise, as shown in Fig. 12, it will elevate the roller 170, moving the plate 160 to the left.

As a result of the operation of the gearing and cam arrangement, which is duplicated at each side of the machine as shown in Fig. 7, the spaghetti first will have been brought over and aligned by means of the screw or rigid rod member M, then deposited upon the plates, which are held in elevated position as shown in Fig. 9, while the back plate L is being successively advanced by means of the cam 125, with the stick in the meanwhile being removed and ejected by means of the downwardly projecting finger 60 along the guideway 59 and past the swinging gate or back wall member 61, whence it is thrown into the discharge trough or guideway 67. When this occurs, the finger 60 will actuate the micro-switch 68 to initiate the conveyor chains N and move the aligned spaghetti through the cutters T, as shown in Figs. 9 and 10, and on to the belts shown at the right of Fig. 2, and finally into the storage arrangement as shown to the right of Fig. 1, where they may be picked up and deposited for packaging purposes.

At the time this operation is initiated by operation of the micro-switch 68, the forward wall L will have been moved back to its outside position by the cam 125, and will be on the dwell 124.

At the same time the plates will have been lowered from their dot and dash line position in Fig. 8 to the solid line position in Fig. 8, so that the aligned spaghetti or macaroni may be engaged by the chains and moved to the right, as shown in Figs. 2 and 9, and forced under the breakers or cutters T, as shown in Figs. 9 and 10.

The chains N for carrying the spaghetti away from the table G are shown most clearly in Figs. 2, 8, 9, and 10. These chains extend across the table and to the rubber conveyor belt arrangement U shown at the right of Fig. 2. In the preferred form, there are shown four spaced chains N (see Fig. 8), which are driven by sprockets 190 and carried on the shaft 191, which extends across the machine and has bearings (see Fig. 8) at 192 at each side thereof. The chains N are desirably provided with slight upper projections which will be sufficient to engage the spaghetti and carry it to the right in Figs. 1, 2, 7, and 9.

At th other side of the table and at the point of transfer to the rubber belt conveyors U, the chains are driven by means of the sprockets 192 on the shafts 193. As the chains carry the spaghetti indicated at 194 in Fig. 9 to the breakers or cutters T, there will be provided the auxiliary upper chains 195 and the auxiliary lower chains 196. The upper chains are driven by the sprockets 197 and 198 on the shafts 199 and 200.

The lower chains 196 are driven by means of the sprockets 201 and 202 on the shafts 203 and 204. These additional chains are provided to hold the spaghetti elements 194 in position and force them against the breaker or cutter discs T. As shown best in Fig. 10, there are three breaker or cutter discs T, each of which has a hub 210, 211, and 212, with an adjustable slotted positioning connection 213, 214, and 215 to the shaft 216.

The shaft 216 is driven by means of the sprocket 217, which, as shown upon Fig. 7, is in turn driven by the chain 218 from the small sprocket 219, which is on the same shaft 199 as the sprocket 197. The shaft 216 is carried by the adjustable end members 220 and 221 (see Fig. 10), which are in turn carried by plates 222 and 223.

These plates in turn are mounted upon the adjustable side plates 224, connected by means of the link 225 to the adjustable wheel 226. The plates 224 are pivotally mounted at 227 so that turning the wheel 226 will send the shafts 217 upwardly or downwardly to give the desired adjustment or positioning of the breaker or cutter discs T in respect to the spaghetti elements 154 as they are presented thereto. The top belt or chain 195 will primarily press downwardly upon the spaghetti elements 194 as they are being presented to the cutter or breaker discs T, while the chains N and 196 will hold them on each side of the discs, as shown best in Fig. 10, so that they will not be able to cant sideways as they are being forced through the discs and are being broken thereby. Normally, the disc which is parallel and close to the forward wall L will break off the ends of the loops C of the spaghetti, while the two other cutter or breaker discs T will break the stalks or legs of the spaghetti in even lengths or in as many lengths as may be desired for commercial purposes. The discs or breaker elements T are not normally sharp-edged, but act on the relatively brittle spaghetti by fracturing the legs thereof and also removing the loops.

The broken off loops are then discharged through the loops X through the waste box Y, where they may be returned to the process or reground into an ingredient for the initial spaghetti or macaroni material. By referring to Fig. 7, it will be noted that the shaft 204, which drives the chain 196, is driven by means of the chain 235 through the sprocket 236 from the sprocket 237, which is mounted on the shaft 238 of the reduction box 239 of the motor 240. The length of the main chain may be adjusted by means of the adjustable bearing block 241, which has slotted connections, as indicated at 242, and a threaded adjustment 243.

As soon as the spaghetti has passed the breakers or cutters T and has been broken midway or at several spaced intervals along its legs, it then passes on to the carrier belt system U shown in top view in Fig. 2 and in side view in Fig. 7.

As shown best in Fig. 2, there are eight belts extending from the pulleys 260 on the shafts 261 to the pulleys 262 on the shafts 263. It will be noted that the lower group of belts U diverge from the upper group of belts U in Fig. 2 so that they will separate the broken spaghetti legs. The broken spaghetti is conveyed by these belts over the table 264.

The shaft 263 is adjusted so as to control the tension and tightness of the belts U by means of the movable bearing members 264 and the screw members 265. The screw members 265 extend through the ears 266, which are mounted upon the frame of the machine. The belts U will then dump the broken or cut legs of the spaghetti on to the same circular receiver members W, which consist of pairs of hooks or quarter-circular straps 267 which are tied together by means of the U members 268 serving as handles.

These straps are pivotally mounted, as shown at 269, on the frame of the machine, and they are counterbalanced by the downwardly depending rods with the adjustable weights 271. The spaghetti then will accumulate as indicated at the right of Fig. 1, and may be removed to package at convenient intervals. The operation may be conveniently summarized as follows: The spaghetti is brought to the machine by means of the conveyor chain 10, which will carry the sticks B with the inverted U-shaped loops of spaghetti C. These sticks will act upon the L-shaped or angle-shaped switch or trip members D, which in turn will actuate the micro-switches 19 to set into operation the horizontalizing conveyor chain E. The conveyor chain E has two fingers 20 and 21 which pick up the ends of the sticks B when they have been properly presented to the lever or switch elements D and carry the loops, as indicated best in Figs. 2 and 3, to place them horizontally upon the table G.

As the spaghetti is about to be deposited upon the table G, the cams S will be so actuated as to elevate the plates 80, 81, and 82 from the solid line position to the dot and dash line position, as shown in Fig. 8, which is accomplished by means of the cam 171.

As the stick approaches the extreme right position, as shown in Fig. 3, it will elevate the cam members H on their pivots 57, with the spaghetti being aligned by riding over the grooved aligning rod or scroll rod M until the cam has moved to its extreme right dot and dash position, as shown in Fig. 3, where it is stopped against the rod 69. As this is taking place, the stick B will fall into the hook 58 and be removed from the carrier hook 20 or 21 of the conveyor E.

As soon as the hook 20' or 21 reverses motion and then passes to the left, the cam plates H will fall back to their solid line position and will throw the stick on to the guides 59, upon which it will be carried back by means of the members 60 also connected to the chain. These members 60 will carry the stick from between the legs of the spaghetti and out past the swinging wall member 61 and down to the discharge chute K, finally actuating the micro-switch 68. During this period while the stick is being removed, the aligning wall L will be advanced by means of the cam 125 and the series of projections 127 to 130 to move the loops forwardly and align the spaghetti elements correctly upon the chains N.

The micro-switch 68 at this point will then start the chains N to carry the spaghetti to the side, where it will pass under the breaker or cutter disc T and into the receivers W.

In the modification shown in Fig. 15, similarly functioning parts being indicated by the same numerals and letters as in Figs. 1 to 12, which are, however, primed, the intake chain A' carries the spaghetti between the guide walls 300. This chain 300 carries the sticks B' with the spaghetti C' thereupon. The intake conveyor A', in this embodiment, is driven by the ratchet 301. It will be noted that the right end of the conveyor A' is driven by the ratchet 302, carried by the shaft 303 on the bearing block 304 on the table extension 305.

This table extension has also upwardly extending legs 306 which carry the side guide plates 300.

The ratchet 300 is on the same shaft 307 as the sprocket 308 which drives the chain A'. On the shaft 307 is an arm 309 carrying the driving pawl 310, which is pivoted thereto at 311. This driving pawl and its arm 309 is driven through the arm 312 connected thereto through the hub 313. The arm 312 has a pivoted connection at 314 to the arm 315. The arm 315 is pivotally connected at 316 to the disc member 317. The disc member 317 has a series of slots 318, which carry the pins 319. The plate 317 with the slots 318 is mounted upon the shaft 137'. The shaft 137' carries the cam 125' for driving the plate cam member and the cam 171' for driving the pawl member. The gears 138', 141' will function as already described in connection with Fig. 12. In the arrangement shown in Fig. 13, the drive arrangement is through the ratchet 301, and in this manner better control and frequency is achieved in respect to the advancement of the sticks from the inlet conveyor to the table, and then from the table to the breakers and storage compartment.

Thus it is apparent that the applicant has designed a machine which enables rapid automatic removal of sticks from spaghetti legs, or from macaroni products, without manual intervention and at a relatively high rate and with decreased breakage and under more sanitary conditions. The machine has a high production rate, and eliminates many handling operations which are necessary where the sticks may be placed upon the table by hand and then the spaghetti legs broken into proper lengths manually after the sticks have been removed. The machine of the present invention will produce a better spaghetti product at less cost, and enable the removal of the spaghetti from the sticks and the breaking thereof to be synchronized with other high speed packaging and processing machines.

Having now particularly described and ascertained the nature of the invention, and in what manner the same is to be performed,

What is claimed is:

1. A spaghetti handling machine for removing sticks from inverted dried spaghetti loops and then breaking said loops to size, comprising a conveyor for feeding inverted dried spaghetti loops carried on sticks with the legs of the spaghetti loops originally in vertical position, means, cooperating with said conveyor, for horizontalizing the spaghetti loops, a table for receiving the horizontal spaghetti loops, means for parallelizing the legs of the spaghetti loops on said table, means for removing the sticks from the spaghetti loops, means for operating on the ends of the spaghetti loops for aligning the bends thereof, and means for removing the parallelized spaghetti loops with the bends in aligned condition from said table, and means for breaking the spaghetti loops into predetermined lengths after the removal thereof from said table.

2. The spaghetti handling machine according to claim 1 wherein the means for cooperating with the conveyor for horizontalizing the spaghetti loops includes an apron spaced from and, for a distance, substantially parallel to said conveyor.

3. The spaghetti handling machine according to claim 1 wherein the means for parallelizing the legs of the spaghetti loops comprises a grooved rod positioned above said table to align said legs parallel to their direction of movement and transverse to said table.

4. The spaghetti handling machine according to claim 1 wherein the means for removing the sticks from the spaghetti loops includes pivotally mounted cam plates, one mounted on each side of the machine, each having a hook thereon for engaging the ends of said sticks whereby the sticks will be removed from said conveyor as well as said spaghetti loops.

5. The spaghetti handling machine according to claim 1 wherein the means for aligning the bends of the spaghetti loops comprises a plurality of movable plates on said table, and relatively movable walls at the ends of said table for operating on the bends and ends of the legs of the spaghetti loops.

6. The spaghetti handling machine according to claim 5 wherein said plates on said table are movable upwardly, the means for moving said plates comprising a cam plate at the side of said table having notches therein, and rods attached to said plates on said table and carried in said notches whereby upon movement of said cam plate the plates on said table will be moved.

7. A spaghetti handling machine for removing sticks from inverted dried spaghetti loops and then breaking said loops to size, comprising a conveyor for feeding inverted dried spaghetti loops carried on sticks with the legs of the spaghetti loops originally in vertical position, means, cooperating with said conveyor, for horizontalizing the spaghetti loops, a table for receiving the horizontal spaghetti loops, means for parallelizing the legs of the spaghetti loops on said table, means for removing the sticks from the spaghetti loops, means for operating on the ends of the spaghetti loops for aligning the bends thereof, and means for removing the parallelized spaghetti loops with the bends in aligned condition from said table, said last-named means comprising a plurality of conveyor chains movable over said table in a direction transverse to the feed of the spaghetti loops to said table, and means between the conveyor chains at a position spaced from said table for breaking the spaghetti loops into predetermined lengths after the removal thereof from said table.

8. A spaghetti handling machine for removing sticks from inverted dried spaghetti loops and then breaking said loops to size, comprising an endless chain conveyor for feeding inverted dried spaghetti loops carried on sticks with the legs of the spaghetti loops originally in vertical position, hooks on said conveyor for supporting said sticks thereon, an apron cooperating with said conveyor for horizontalizing the spaghetti loops, a table for receiving the horizontal spaghetti loops, a grooved rod and movable plates on said table for parallelizing the legs of the spaghetti loops, means for removing the sticks from the spaghetti loops and from said table, means for operating on the ends of the spaghetti loops for aligning the bends thereof, and means for removing the parallelized spaghetti loops with the bends in aligned condition from said table, means for breaking the spaghetti loops into predetermined lengths after removal thereof from said table, and means for holding said spaghetti loops while they are being broken.

References Cited in the file of this patent

UNITED STATES PATENTS

| | | |
|---|---|---|
| 945,222 | Chong | Jan. 4, 1910 |
| 1,286,029 | Kraybill | Nov. 26, 1918 |
| 2,504,339 | Mariani | Apr. 18, 1950 |
| 2,622,545 | Hummel | Dec. 23, 1952 |
| 2,649,055 | Borrelli | Aug. 18, 1953 |
| 2,649,056 | Autenrieth | Aug. 18, 1953 |
| 2,710,583 | Fava | June 14, 1955 |
| 2,827,001 | Curioni | Mar. 18, 1958 |